(12) United States Patent
O'Connell

(10) Patent No.: US 6,922,410 B1
(45) Date of Patent: Jul. 26, 2005

(54) ORGANIZATION OF DATABASES IN NETWORK SWITCHES FOR PACKET-BASED DATA COMMUNICATIONS NETWORKS

(75) Inventor: Anne G. O'Connell, Dublin (IE)

(73) Assignee: 3Com Technologies, Georgetown (KY)

( * ) Notice: Subject to any disclaimer, the term of this patent is extended or adjusted under 35 U.S.C. 154(b) by 0 days.

(21) Appl. No.: 09/286,469

(22) Filed: Apr. 6, 1999

(30) Foreign Application Priority Data

May 21, 1998 (GB) .............................................. 9810841

(51) Int. Cl.[7] .............................................. H04L 12/56
(52) U.S. Cl. ...................... 370/401; 370/392; 370/389; 711/216
(58) Field of Search ................................ 370/389, 392, 370/397, 399, 401, 390, 398, 402, 409, 425, 426, 428; 709/238; 711/202, 216

(56) References Cited

U.S. PATENT DOCUMENTS

| 5,434,863 | A | * | 7/1995 | Onishi et al. ................ 370/402 |
| 5,708,659 | A | | 1/1998 | Rostoker et al. |
| 5,740,175 | A | | 4/1998 | Wakeman et al. |
| 5,852,607 | A | * | 12/1998 | Chin ........................... 370/401 |
| 6,038,608 | A | * | 3/2000 | Katsumata ................... 709/238 |
| 6,101,188 | A | * | 8/2000 | Sekine et al. ................ 370/401 |
| 6,317,775 | B1 | * | 11/2001 | Coile et al. ................. 709/201 |
| 6,359,886 | B1 | * | 3/2002 | Ujihara et al. .............. 370/392 |
| 6,580,712 | B1 | * | 6/2003 | Jennings et al. ............. 370/392 |

FOREIGN PATENT DOCUMENTS

EP 0594196 A1 4/1994

* cited by examiner

*Primary Examiner*—Duc Ho
*Assistant Examiner*—Thien Tran
(74) *Attorney, Agent, or Firm*—Nixon & Vanderhye P.C.

(57) ABSTRACT

A network switch (10) for a packet-based data communication network, comprises a plurality of ports for the reception and transmission of data and means for establishing a database for controlling the passage of data between the ports. The database comprises a data table (17) for holding data entries each comprising a media access control address and an identification of a port, and a pointer table (16) of which the entries each comprise a network address and an associated pointer to an entry in the said data table. The pointers are accessed by hashing network addresses in received packets.

9 Claims, 3 Drawing Sheets

ORGANIZATION OF DATABASES IN NETWORK SWITCHES FOR PACKET-BASED DATA COMMUNICATIONS NETWORKS

FIELD OF THE INVENTION

This invention relates to network switches for providing controlled access, in accordance with network addresses contained in data packets, to a multiplicity of remote stations.

BACKGROUND TO THE INVENTION

A network switch which has a multiplicity of ports disposed, for example, for receiving packet data from a variety of sources and other ports connected to groups of remote stations by intermediate devices, conveniently termed gateways, requires for its efficient operation a database by means of which a network address of a network destination and contained within an incoming packet is related to a media access control address, for example identifying a respective gateway, and an identification, such as masking data, of the port to which the intermediate device or gateway is connected. One way to decode incoming network addresses to use a hash table, indexed according to hashed addresses and consisting of pointers to entries in an associated data table of which the entries comprise a network address, a media access control address and a relevant port mask.

The state of the art is exemplified by the United States patent to Rostoker et al, U.S. Pat. No. 5,708,659, issued 13 Jan. 1998. That patent describes in considerable detail the organisation and detailed operation of a network switch in which predetermined numbers of bits from a packet address is selected to use a hash key, which is used to compute a table address. It further discloses the comparison of the contents of the table at that address with packet address information so that if the compared information matches, the packets may be transmitted over the port associated with the particular destination address. Other features of network switches, such as the storage of packets in buffer memories and the use of pointers, are fully described in the aforementioned patent. The performance of source address and destination address look-ups is also described in the European patent application EP-0594196 published 27 Apr. 1994. That describes a hybrid system in which searching of a relative large database is performed using a combination of programmable hash algorithms, binary search algorithms and a content-addressable memory.

Both network addresses and media access control addresses are normally quite wide, typically comprising 32 bits and 48 bits respectively. In practice however when remote stations are grouped by connection to a common intermediate device or gateway, the entries in the database contain a large degree of redundancy and therefore occupy substantially unnecessary space in a storage medium. In particular, where different remote stations share the same gateway, the entries in a data table indexed according to the network addresses of the remote stations will contain for each of the network addresses in a given group, identical media access control addresses and port masks for each of the stations in the group. A further disadvantage in known systems is a need to verify the network address relevant to an entry in a hash table of pointers. This arises in practice because network addresses of incoming packets are commonly reduced (by hashing) in width, so as to become a size matched for accessing the hash table.

SUMMARY OF THE INVENTION

The present invention provides an improved technique for managing a database in a network switch of the character described above. The present invention is based on the use of a data table containing a media access control address and a port mask, identifying a port connected to the intermediate device identified by the media access control address, and a hash table which includes the network addresses of the remote stations, the combined effect being a table of network addresses, media access control addresses and port numbers. In the use of such a technique, the space in the database for a given media access control address will be substantially reduced since it is required only to appear once, the hash table entries for the remote stations sharing the same media access control address each including a pointer all pointing to the single entry in the data table.

DETAILED DESCRIPTION OF A PREFERRED EMBODIMENT

As indicated previously, the invention relates to network switches such as routers, which may for example function so that users in different sub-nets may communicate In a typical system, a group of users, which share the same portion of a network address, form a sub-net. A group of sub-nets can be connected to a 'backbone' or wide area network (WAN) by a network switch. A network switch in this context can build up a table of addresses for each sub-net so as to manage traffic between the sub-nets. There may be a 'default' route to the WAN from each router. Routers may now respond to network (layer 3) addresses as well as MAC addresses and may accordingly be termed 'layer 3' switches.

Figure 1:
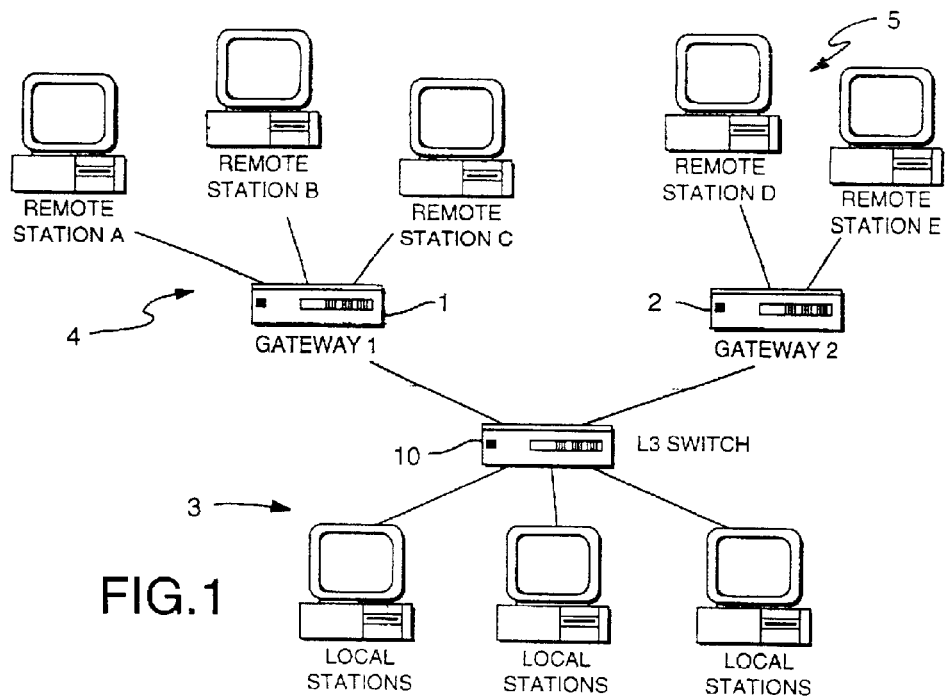
FIG. 1 illustrates part of a data communication network including a network switch, various local stations, gateways and remote stations.

FIG. 1 illustrates part of a packet-based data communication network comprising a network switch 10 which has various ports connected to local stations 3 and, in this embodiment, two ports which are respectively connected to intermediate switches, conveniently termed gateways, which are themselves connected to a respective group of remote stations. In the greatly simplified network shown in FIG. 1, the first gateway 1 is connected to a first group 4 of remote stations A, B and C, and the second gateway 2 is connected to a second group 5 of remote stations D and E. The switch is a 'layer 3' switch, which means that in terms of current standards relating to packet format and transmission, it can respond to network addresses such as IP (internet protocol) addresses for directing packets from, for example, the local stations to the port coupled to the intermediate gateway itself coupled to the remote station identified by the network address.

Figure 2:
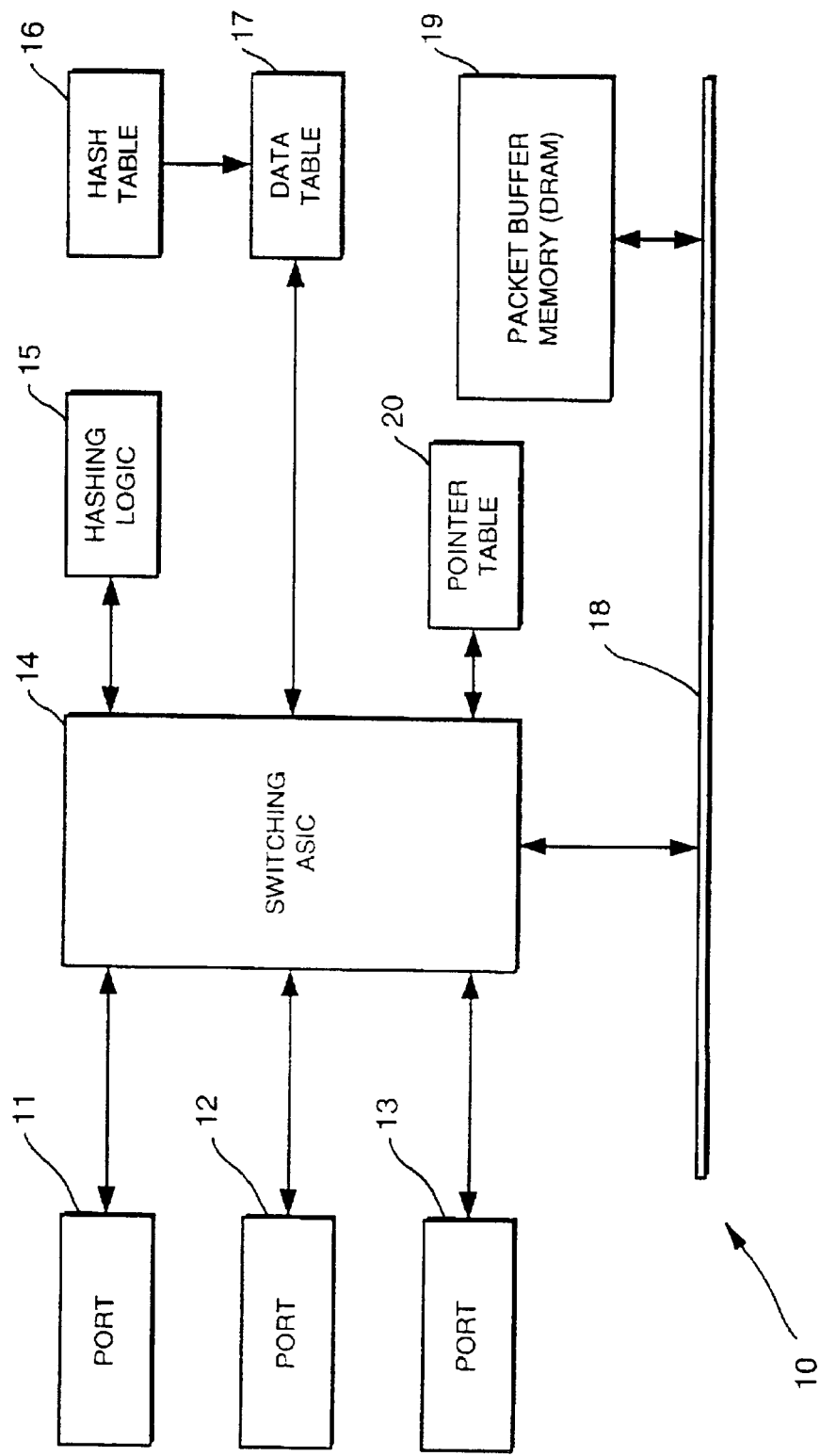
FIG. 2 illustrates a network switch in which the present invention may be used.

FIG. 2 illustrates a network switch which, apart from the organisation of a hash table and data table as described hereinafter, is in a generally known form, for example that described in the aforementioned Rostoker at al, U.S. Pat. No. 5,708,659.

The network switch shown in FIG. 2 comprises a multiplicity of ports 11, 12 and 13 as well as other ports (not shown) all coupled bidirectionally to a switching ASIC 14, which performs the basic switching operations needed to direct packets to memory, to organise look-ups on source and destination addresses in a data table, to perform any necessary contention resolution (especially if the network is an Ethernet network) and so on. All these functions are well known to those skilled in the art and will not be described in detail. Basically, packets received by the ports may be temporarily stored in receive buffers associated with each port but on transmission from those receive buffers are directed by the switching ASIC and a bus 18 to a packet buffer 19, preferably constituted by dynamic random access memory. The switching ASIC provides for the storage in a pointer table 20 of pointers to the buffers 19 so that the packets can be retrieved from the buffer memory and transmitted onwardly by way of the respective port or ports.

The switching ASIC also causes, in a manner which is generally known in itself, the storage of address data and the relevant port mask in a data table 17. Pointers to the entries in the data table 17 are held in a hash table 16, which is accessed by hashing the network address from a receive packet by means of hashing logic 15.

Figure 3:
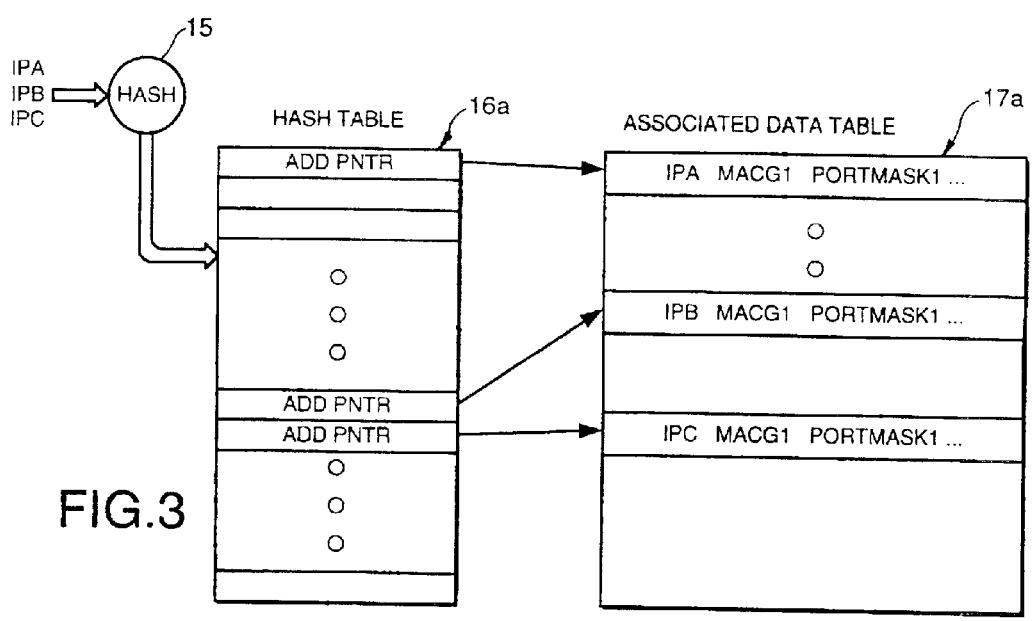
FIG. 3 illustrates a known manner of organising a database for the control of the routing of signals through the network switch.

FIG. 3 illustrates the manner in which a hash table 16a and an associated data table 17a are organised according to current practice.

In particular, when a packet is received by the switch 10 from any of the local stations 3 in FIG. 1 and has, for example, an intended destination for one of the remote stations in one or other of the groups accessed by means of the gateways, the network address (IP) from the header part of the packet is employed in a hashed form to look up a pointer in the hash table 16a, the pointer pointing to an entry in the associated data table 17a in which the entries each comprise at least the network address of a remote station, the media access control address of a gateway by way of which the remote station can be accessed, and a port mask identifying the port to which the intermediate gateway is connected. In general, in a practical network more complex than that shown in FIG. 1 there may be different paths to a remote station by way of different gateways.

For the sake of example, FIG. 3 is annotated to show the storage of entries relating to three network addresses, IPA, IPB and IPC, identifying the remote stations A, B and C in the group 4 connected to switch 10 by way of gateway 1. The respective pointers in hash table 16a point to entries in the data table 17a. An entry identifying remote station A will have the network address (IPA), the layer 2 or media access control address (MACG1) of the gateway 1, and an identification of the port (port mask 1) to which gateway 1 is connected.

Currently, when a packet is received by the switch from a local station and has an intended destination of one of the remote stations, the network address (IP) from the header part of the packet is employed in a hashed form to look up a pointer in a hash table 16a, the pointer pointing to an entry in an associated data table 17a in which the entries each comprise at least the network (IP) address of a remote station, the media access control address of the respective gateway to which the remote station is connected and a 'port mask', identifying the port to which the intermediate gateway is connected.

Typically the hashed addresses are formed by performing arithmetic operations on the network address. The operation may comprise an XOR function such as a folded XOR function. The operation reduces the width of the network address from n bits to m bits, where m<n. The hash table is normally a sparsely populated table; the more sparsely populated it is, the greater the probability of a unique match for a given hash function, i.e. a single location in an associated data table. Since however different network addresses could be hashed to the same result, the entry to which a pointer points must be checked to verify a match. If there is no match in a first location in the associated data table pointed to by the pointer, there will be a linked list of other possible matches each of which may have to be searched to find a correct match.

As may be seen from FIG. 3, there is an entry in the associated data table for every remote station. These entries are necessarily wide because network addresses and media access control addresses are typically wide (for example 32 bits and 48 bits respectively), and in practice for network addresses and media access control addresses of this width, the data table needs to be 128 bits wide. Further, since the media access control address of a gateway connected to a multiplicity of remote stations is the same for each of the entries in the data table of those stations, there is a high degree of redundancy of the entries within the associated data table.

Figure 4:
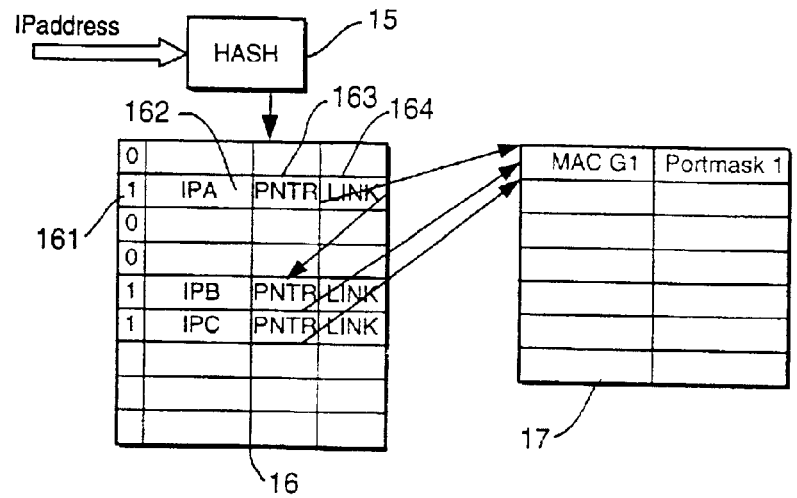
FIG. 4 illustrates an improved technique for managing a database for the network switch.

FIG. 4 illustrates an improved technique for managing the controlling database in a switch of this nature. The technique can reduce required data space and avoid the need to verify hashed addresses.

In the scheme shown in FIG. 4, an incoming data packet having a network address (IPA, IPB, IPC etc) is caused to generate an entry in the hash table 16 (if it be a new address) and to provide access to an address pointer in the hash table if such entry is already there. The hash table contains a multiplicity of entries each of which contains the network address of a remote station and an address pointer which points to the entry in the associated data table 17 containing the media access control address (e.g. MACG1) and the port mask defining the intermediate device (the gateway) to which the remote station is connected and, respectively, the port to which the associated gateway is coupled.

It may be noticed that the associated data table does not include the network address of the remote station. Further, those remote stations which share the same gateway have entries in the hash table including pointers pointing to the common entry in the associated data table. Thus there is only one data entry in the associated data table for all remote stations accessed through the respective common gateway.

Each entry in the hash table comprises a validity bit 161, an IP address 162, an address pointer 163 to a location in the associated data table and a link pointer 164, as shown for the first entry in the table 16. The hash table is accessed by hashing an IP address of the incoming packet (or part of the IP address) to develop a pointer to a location in the hash table.

Figure 5:
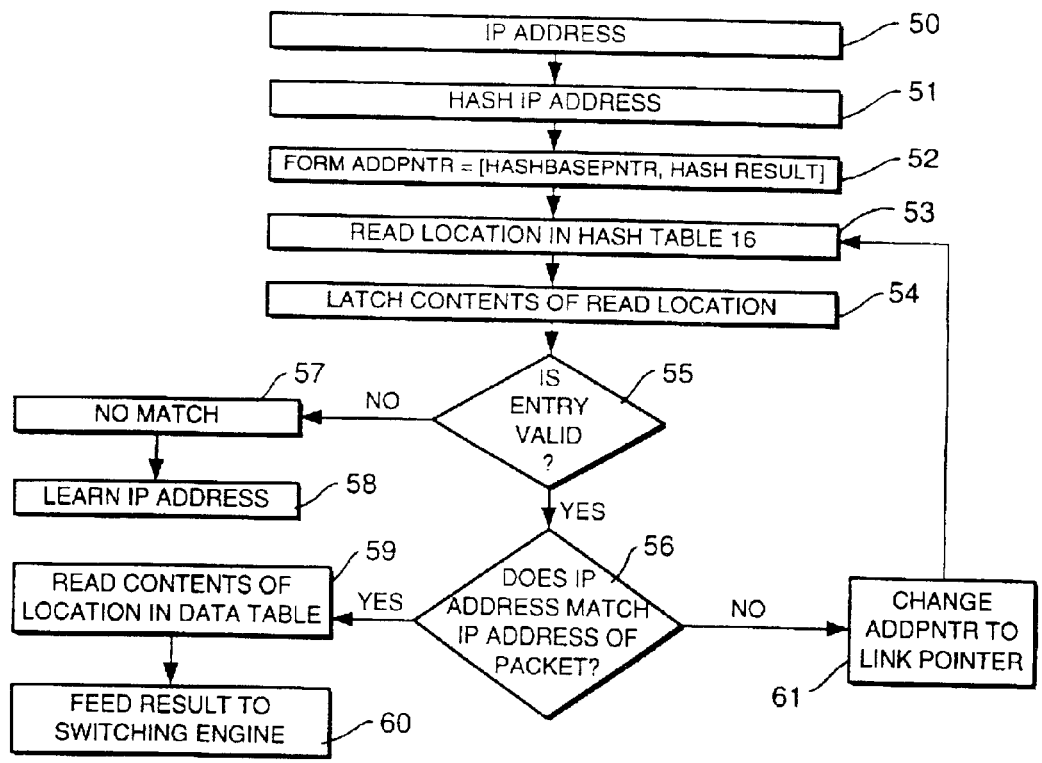
FIG. 5 is a flow diagram of the process for accessing the hash table and data table.

Since hashing normally reduces a relatively wide address to a relatively narrow pointer (e.g. from 32 to 16 bits) it is normally desirable to link entries in the hash table by means of link pointers so as to ensure that all the relevant entries will be examined. Further, a hash generator typically has a width (e.g. 16 bits) somewhat narrower than the address which is hashed and a multi-stage hashing process would usually be employed. FIG. 5 illustrates a typical look-up process employing a database organised according to FIG. 4.

The IP address (or part of it) at stage 50 is hashed (stage 51) to develop an address pointer AddrPntr (stage 52), which may be formed from the 'hash result' and an offset, hash- BasePntr. The address pointer is used to read the respective location in the hash table (stage 53). The contents of that location are latched (stage 54) to allow a test of the validity bit (stage 55) and a test for an IP address match (stage 56). If the validity bit is '0', the location is empty (i.e. there is no valid entry) and there is no match (stage 47) between the hashed address and the table 16. Normally such a negative result would be followed by a process of learning the IP address (stage 58) and the creation of an entry in the hash table, in the customary manner of building look-up tables. If the entry is valid, the validity bit being '1', a check is made for identity between the IP address in the respective packet and the IP address in the hash table entry. If the entry contains the correct IP address, the entry in the associated data table to which the pointer points is read (stage 59) and the result (the MAC address and port mask) is fed to the switching engine (stage 60). If however the IP addresses do not match, the link pointer of the examined entry is used as the address pointer (stage 61) and the stages 53 to 56 repeated until an IP address match is found.

It may be noted that in some circumstances it is not essential that the full IP address be used, especially when the remote stations have IP addresses which have a degree of similarity. In particular, it is feasible to perform a progressive look-up (known as a trie search) on an IP address. In such a scheme the last search stage comprises a table of partial IP addresses which may be hashed to access the associated data table. Thus the term 'network address' is intended to embrace address data having the character but not necessarily the totality of a full network address.

What is claimed is:

1. A network switch for a packet-based data communication network comprising a plurality of ports for the reception and transmission of data packets and means for establishing a database for controlling the passage of data packets between the ports, the database comprising a data table for holding data entries each comprising a media access control address and an identification of a port, and a hash table accessible by hashing at least a part of respective network addresses of received data packets, said hash table having entries each comprising a network address and an associated pointer to an entry in the said data table and in which said data table does not hold said network addresses;

wherein the pointers associated in said hash table with network addresses which share a common media access control address in said switch all identify a single common entry in said data table thereby reducing the space required for the database by avoiding redundant storage of common media access control addresses.

2. A method of operating a network switch in a packet-based data communication network, wherein the network switch has a multiplicity of ports each connected to a respective group of remote stations by way of an intermediate network device, the network switch responding to network addresses in packets received by the network switch to look up in a data table a media access control address for the respective intermediate device, said method comprising:

(a) responding to a network address of an incoming packet to access a pointer table of address pointers identifying an entry in said data table;

(b) storing network address entries in the pointer table and not in the data table; and (c) causing the address pointers for all the network addresses of remote stations coupled to the switch by way of the same intermediate device to identify a single common entry for that device in said data table.

3. A method according to claim 2 wherein the step (a) includes hashing the network addresses to access the pointer table.

4. A network switch for a packet-based data communication network, comprising a plurality of ports for the reception and transmission of data packets which include network address data and media access control address data, comprising:

a database for controlling the passage of data packets between the ports, the database comprising a first data table for holding data entries each comprising a network address; and means for hashing network address data of said packets to access said first data table; and further comprising a second data table containing entries comprising forwarding data including a destination media access control address; wherein:

said entries in the first data table each include a pointer to an entry in said second data table and said second data table does not include network address data.

5. A network switch according to claim 4 wherein the pointers associated in said first data table with network addresses which share a common media access control address in said switch all identify a single common entry in said second data table.

6. A network switch for a packet-based data communication network, comprising a plurality of ports for the reception and transmission of data packets which include network address data and media access control address data, comprising:

a database for controlling the passage of data packets between the ports, the database comprising first and second data tables, wherein:

network address data and media access control data are held separately in different ones of said first and second data tables;

said first data table holds data entries each comprising a network address and a pointer to an entry in said second data table; and said second data table contains data entries each including a destination media access control address and an identification of a port;

whereby different entries in said first data table can contain pointers to the same data entry in said second data table thereby avoiding redundant storage of common media access control data for different network addresses.

7. A network switch for a packet-based data communication network, comprising a plurality of ports for the reception and transmission of data packets which include network address data and media access control address data, comprising:

a database for controlling the passage of data packets between the ports, the database comprising first and second data tables, wherein:

said first data table is accessible in response to network address data in said data packets and holds data entries each comprising a network address and a pointer to an entry in said second data table; and said second data table contains data entries each including a destination media access control address and an identification of a port and not including network addresses;

whereby different entries in said first data table can contain pointers to the same data entry in said second data table.

8. A network switch according to claim 7 and further comprising hashing said network address data in said packets to access said first data table.

9. A network switch for a packet-based data communication network, the switch comprising a plurality of ports for the reception and transmission of data packets that include network address data and media access control data and a database for controlling the passage of data packets between the ports, the database being accessible by hashing at least a part of the network address of received data packets and including entries for network addresses, media access control addresses and port identification;

wherein redundant entries of common media access control addresses is avoided by having:

a first data table, accessible by said hashing, containing network addresses and associated pointers to an entry in a second table; and the second table containing the media access control addresses and port identification; and wherein pointers from network addresses in said first data table having a common media access control address in said switch identify a single common entry in said second table.

* * * * *